United States Patent [19]
Ono

[11] Patent Number: 5,903,186
[45] Date of Patent: May 11, 1999

[54] DEMODULATOR OF MSK SIGNAL

[75] Inventor: Takahiro Ono, Tokyo, Japan

[73] Assignee: NEC Corporation, Tokyo, Japan

[21] Appl. No.: 09/015,076

[22] Filed: Jan. 29, 1998

[30] Foreign Application Priority Data

Jan. 30, 1997 [JP] Japan ..................................... 9-016584

[51] Int. Cl.⁶ .............................. H03D 3/00; H04L 27/14
[52] U.S. Cl. .......................... 329/300; 329/303; 375/328; 375/336
[58] Field of Search .................................. 329/300–303; 375/328, 336

[56] References Cited

U.S. PATENT DOCUMENTS 3,778,727  12/1973  Williams ................................. 329/303

FOREIGN PATENT DOCUMENTS 60-214143  10/1985  Japan .

*Primary Examiner*—David Mis
*Attorney, Agent, or Firm*—Foley & Lardner

[57] ABSTRACT

A demodulator for demodulating an MSK signal constituted by a sequence of MSK modulated symbols is disclosed. An exclusive OR signal obtained by delay detection is delayed by delay times shorter than one symbol time. The delayed signals thus obtained are logically processed in parallel. Each symbol thus can be recovered by demodulation in one symbol time.

10 Claims, 4 Drawing Sheets

DEMODULATOR OF MSK SIGNAL

BACKGROUND OF THE PRESENT INVENTION

The present invention relates to a demodulator for demodulating signals obtained by MSK (minimum shift keying) modulating digital signals.

MSK demodulators of this type serve to receive an MSK modulation signal (hereinafter referred to as MSK signal), which is obtained by MSK modulating symbols represented by digital signals, and demodulates the MSK signal to restore the symbols. In MSK modulation, for instance representing each symbol with binary signal "1" or "0", the binary signal "1" is expressed by one cycle of frequency f, and the binary signal "0" is expressed by half cycle of frequency f/2. This means that a binary signal is assigned to each predetermined time slot. It will be seen that where modulation signals of frequencies f and f/2 are corresponded by the binary signals "1" and "0", respectively, each of these modulation signals can take two different states. Where the binary signal "0" is expressed by half cycle of frequency f/2, the modulation signal may take either positive or negative half cycle in one time slot. This also applies to the binary signal "1".

Transition from a binary signal to the next one is either from "1" to "1", from "1" to "0", from "0" to "0" or from "0" to "1". Where the above frequencies are assigned to binary signals which present the above transitions, waveform discontinuities may arise at transition instants of modulation signal. In an actual MSK demodulator, usually each binary signal is sampled a plurality of times during one time slot to provide a sample signal.

In a usual MSK demodulator, an exclusive OR signal which represents the relation between adjacent modulation signals, is obtained by exclusively ORing a binary signal sequence and a delay signal obtained by delaying each binary signal by one symbol time (i.e., one time slot), and each binary signal is demodulated by passing the pertinent exclusive OR signal through a low-pass filter. This means that each binary signal is demodulated by utilizing the relation between adjacent modulation signals.

However, it is difficult to realize an MSK demodulator, which includes such a low-pass filter as analog element, in the form of a chip by using semiconductor integrated circuit techniques. Such an MSK demodulator, therefore, cannot meed the size reduction demand. It is conceivable to construct the low-pass filter as a digital filter. The digital filter construction, however, requires complicated design and is therefore not practical from the economical standpoint.

An MSK demodulator which does not employ any low-pass filter is disclosed in Japanese Laid-Open Patent Publication No. 6-214143 (hereinafter referred to as Reference 1). In this MSK demodulator, a demodulation symbol in one symbol time is determined by monitoring a delay detection signal, which is obtained by delay detection of one time slot sampling result, in a waveform shaper. In this case, the waveform shaper includes a delay circuit for further delaying the delay detection signal by one symbol time. With this construction, the demodulation of MSK modulation signal can be realized in sole digital signal processing. It is thus possible to readily obtain demodulation symbols using general-purpose microcomputer software.

In the meantime, as a result of researches and investigations conducted by the inventors, it was found that where an MSK signal is digitally processed by sampling an exclusive OR signal obtained by exclusively Oring the MSK signal and a delayed signal obtained by delaying the MSK signal by one time slot, chattering is readily generated between adjacent symbols.

Reference 1 teaches nothing about the chattering that is generated at the moment of transition between adjacent symbols, although it shows the digital processing of the exclusive OR signal. Such chattering disables accurate demodulation to recover symbols. Besides, according to Reference 1 the delay detection signal obtained by the delay detection is further delayed in the waveform shaper by two symbol times to recover symbols. This means that the waveform shaper requires a flip-flop or like circuit element as a delay circuit, which provides a long delay time for symbol-by-symbol delaying. Therefore, the construction is complicated, and long time is required to recover demodulation symbols.

SUMMARY OF THE INVENTION

An object of the present invention is to provide an MSK demodulator, which has a simplified construction and permits quick MSK signal demodulation.

Another object of the present invention is to provide an MSK demodulator, which can eliminate adverse effects of chattering that is liable to occur when an MSK signal is digitally processed.

A further object of the present invention is to provide an MSK demodulator, which is free from erroneous operation due to chattering.

According to an aspect of the present invention, there is provided a demodulator for demodulating an MSK signal constituted by a sequence of MSK modulated symbols, comprising, a logic operation circuit for receiving the MSK signal and a delayed signal obtained by delaying the pertinent MSK signal by one symbol time and providing a logic operation result signal representing the result of a logic operation on the MSK signal and the delayed signal, a first delay circuit for delaying the logic operation result signal by a first delay time shorter than the one symbol time to provide a first delayed output signal, a second delay circuit for delaying the logic operation result signal by a second delay time shorter than the one symbol time to provide a second delayed output signal, and a logic processing unit for processing the first and second delayed output signals with the logic operation result signal in a parallel process, thereby decoding the MSK signal to recover symbols.

The first and second delay times are equal or the first and second delay times are different from each other, and the second delay time is shorter than the first delay time.

The logic processing unit includes a first AND gate for ANDing the first delayed output signal and the logic operation result signal and providing a first AND signal, an OR gate for Oring the first delayed output signal and the logic operation result signal and providing an OR signal, a second AND gate for ANDing the second delayed output signal and the first AND signal and providing a second AND signal, a NOR gate for NORing the OR signal and the second delayed output signal and providing a NOR signal, a flop-flop circuit for being set by the second AND signal and reset by the NOR signal, thereby providing a set/reset output signal, and an inverter for inverting the polarity of the set/reset output signal.

The first and second delay times are different from each other by a time difference sufficient to prevent chattering occurring between adjacent symbols during decoding in the logic processing unit.

According to another aspect of the present invention, there is provided an MSK demodulator for demodulating an MSK signal constituted by a sequence of MSK modulated symbols to recover the sequence of symbols by receiving the MSK signals and delayed signal obtained by delaying the MSK signal by one symbol time and processing a logic operation result signal obtained by executing a logic operation on the MSK signal and the delayed signal, the logic operation result signal being delayed by different delay times to obtain a first and a second delayed output signal, the first and second delayed output signals being digitally processed with the logic operation result signal to remove chattering between adjacent symbols.

According other aspect of the present invention, there is provided a demodulating method for demodulating an MSK signal constituted by a sequence of MSK modulated symbols, comprising, exclusive OR operation for the MSK signal and a delayed signal obtained by delaying the pertinent MSK signal by one symbol time to provide a logic operation result signal, delaying the logic operation result signal by a first delay time shorter than the one symbol time to provide a first delayed output signal, and delaying the logic operation result signal by a second delay time shorter than the one symbol time to provide a second delayed output signal, and processing the first and second delayed output signals with the logic operation result signal in a parallel process to decode the MSK signal.

Other objects and features will be clarified from the following description with reference to attached drawings.

PREFERRED EMBODIMENTS OF THE INVENTION

Figure 1:
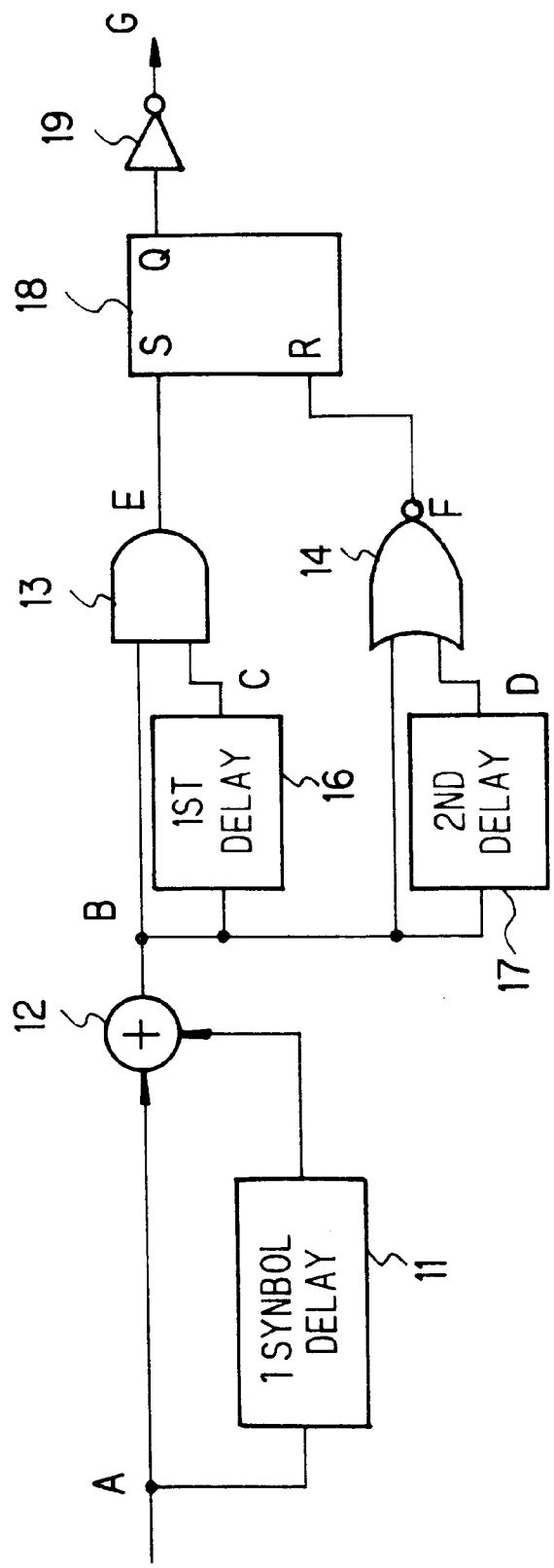
FIG. 1 shows a block diagram of an embodiment of the MSK modulator according to the present invention.

Referring to FIG. 1, a first embodiment of the MSK modulator according to the present invention is shown, which serves to receive an input MSK signal and sends out an output demodulation signal G. The MSK demodulator as shown comprises a symbol delay circuit 11 for delaying the input MSK signal A by one symbol time and provides a delayed signal, and an exclusive OR gate 12 for receiving the input MSK signal and the received signal to exclusively OR the two signals and provide an exclusive OR signal. The symbol delay circuit 11 and exclusive OR circuit 12 constitute a delay detection circuit.

The operation of the delay detection circuit described above, will be described by also having reference to FIGS. 2(a) to 2(f) and denoting a preceding MSK signal by A1 and a present MSK signal succeeding the MSK signal A1 by A2. The preceding input MSK signal A1 is a delay signal provided from the symbol delay circuit 11, and is provided together with the present MSK signal A2 to the exclusive OR circuit 12.

Shown in FIG. 2(a) is a case in which logics "1" are given as the preceding and present MSK signals A1 and A2. In this case, the exclusive OR gate 12 provides a low level output as exclusive OR signal B, as is seen from FIG. 2(a). The logic "1" is in the form of a 5-cycle sample signal in one symbol time.

Shown in FIG. 2(b) is a case in which logics "0" are given as the preceding and present MSK signals A1 and A2. The logic "0" is in the form a 4.5-cycle sample signal in one symbol time. This means that when logics "0" appear successively, a deviation by a half cycle is caused for each symbol and, as a result, the exclusive OR gate 12 provides a high level output as exclusive OR signal B.

Shown in FIG. 2(c) is a case in which logics "0" and "1" are given as the preceding and present MSK signals A1 and A2, respectively. In this case, logic "0" starting from the high level and logic "1" starting form the low level are provided to the exclusive OR gate 12. The exclusive OR gate 12 thus provides an output signal containing high level pulses with successively reducing lengths, as shown in FIG. 2(c), as exclusive OR signal B.

Shown in FIG. 2(d) shows a case in which, like the case shown in FIG. 2(c), logics "0" and "1" are given as the preceding and present MSK signals A1 and A2, respectively. As shown, the logic "0" starts from the low level, while the logic "1" starts from the high level. Again in this case, the exclusive OR gate 12 provides an output signal containing high level pulses with successively reducing lengths as exclusive OR signal B.

Shown in FIG. 2(e) is a case in which logics "1" and "0" are provided as the preceding and present MSK signals A1 and A2 to the exclusive OR gate 12. In this case, it will be seen that the exclusive OR gate 12 provides an output signal containing high level pulses with successively increasing lengths as exclusive OR signal B. Here, both the logics "1" and "0" start from the low level.

Shown in FIG. 2(f) is a case in which, like the case shown in FIG. 2(e), logics "1" and "0" are given as the preceding and present MSK signals A1 and A2, respectively. In this case, however, unlike the case shown in FIG. 2(e), the logics "1" and "0" both start from the high level. Again here, it will be seen that the high level pulses in one symbol time have successively increasing lengths.

Figure 2:
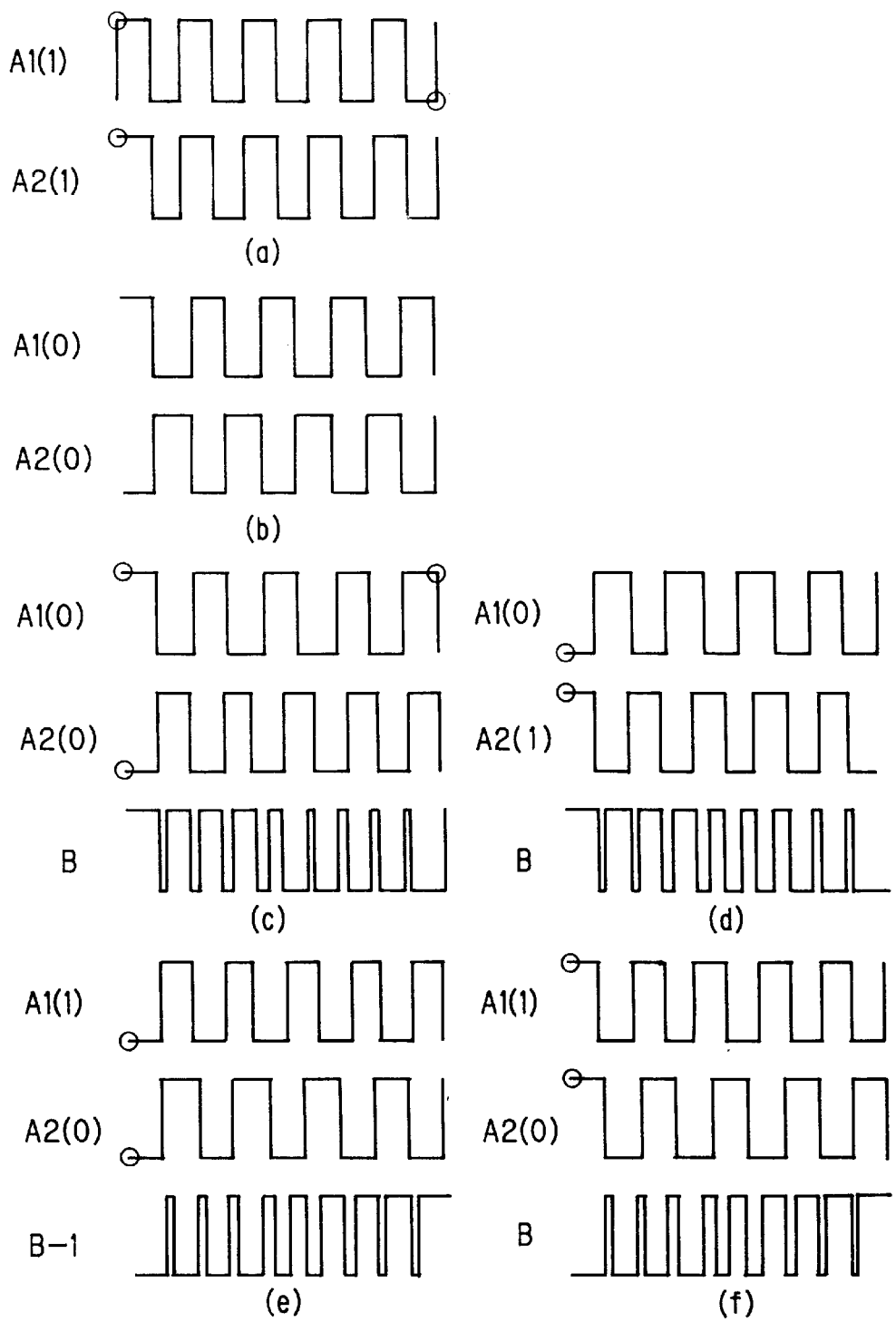
FIGS. 2, (a)–(f) show waveforms for explaining the relationship between the input signal and output signal of the exclusive OR circuit in FIG. 1.

Referring back to FIG. 1, the exclusive OR signal B, as shown in FIG. 2, is supplied to an AND gate 13, a NOR gate 14 and a first and a second delay circuit 16 and 17. The first and second delay circuits 16 and 17 delay the exclusive OR signal B by the same delay time. This delay time is short compared to one symbol time, for instance one cycle time of the sample signal predetermined as the logic "1". The AND and NOR output signals of the AND and NOR gates 13 and 14, respectively, are supplied to a set (S) and a reset (R) terminal of a set/reset flip-flop (SRFF) 18. The output signal of the SRFF 18 is sent out through an inverter 19 as demodulation output signal.

The combination of the illustrated first and second delay circuits 16 and 17, AND gate 13, NOR gate 14, SRFF 18 and inverter 19, is hereinafter referred to collectively as logic processing circuit.

A case will now be considered, in which the exclusive OR signal B as shown in FIG. 2 is provided to the logic processing circuit having the above construction. When a one cycle delayed exclusive OR signal C is identical with the present cycle exclusive OR signal B, the AND gate 13 provides set signal E to the SRFF 18. When adjacent cycle exclusive OR signals B and D are both at low level, the NOR gate 14 provides a reset signal to the SRFF 18.

Specifically, in a symbol time in which a low level signal as shown in FIG. 2(a) prevails as exclusive OR signal B, the SRFF 18 is in the reset state, and the inverter 19 provides logic "1" as demodulation output signal G. When a high level signal prevails as exclusive OR signal B, the AND gate 13 provides the set signal to the SRFF 18 and, as a result, the inverter 19 provides logic "0" as demodulation output G.

When a signal containing high level pulses with successively reducing lengths as shown in FIGS. 2(c) and 2(d) is provided as exclusive OR signal B, the delayed and present exclusive OR signals C and B are identical in successively reducing periods of time. Thus, the AND gate 13 provides set signal E in successively reducing periods, and provides no set signal at the end of one symbol time. When the NOR gate 14 no longer provides any set signal E for the AND gate 13 and the delayed and present exclusive OR signals D and B both become logics "0", the NOR gate 14 provides logic "1" as the output signal, i.e., reset signal F, to reset the SRFF 18. As a result, the inverter 19 provides logic "1" as demodulation output signal G.

When a signal containing high level pulses with successively increasing lengths as shown in FIGS. 2(e) and 2(f) is provided as exclusive OR signal B, the NOR gate 14 provides reset signal F in successively reducing periods, and provides no reset signal F at the end of one symbol time.

When no reset signal F is provided and the delayed and present exclusive OR signals C and B become identical, the AND gate 13 provides set signal E. As a result, the SRFF 18 is set, and the inverter 18 provides logic "0".

As shown above, each symbol can be recovered by demodulating the exclusive OR signal from the exclusive OR gate 12, by delaying the exclusive OR signal B by a period shorter than one symbol time through the first and second delay circuits 16 and 17 connected in parallel and logically processing the delayed exclusive OR signals C and D and the present exclusive OR signal B.

While the construction as described above permits each symbol to be recovered by demodulation in one symbol time, an exclusive OR signal B which contains successive high level pulses having different lengths in one symbol time as shown in FIGS. 2(c) to 2(f), poses a problem. In this case, it was observed that reset signal F is provided transiently right after the output of set signal E a plurality of times during one symbol time. This is attributable to the relation between the delay times of the first and second delay circuits 16 and 17.

It was found that when such a transient state occurs repeatedly, the SRFF 18 having been set once may be reset again during one symbol time, resulting in chattering introduced in the demodulation output signal G.

Figure 3:
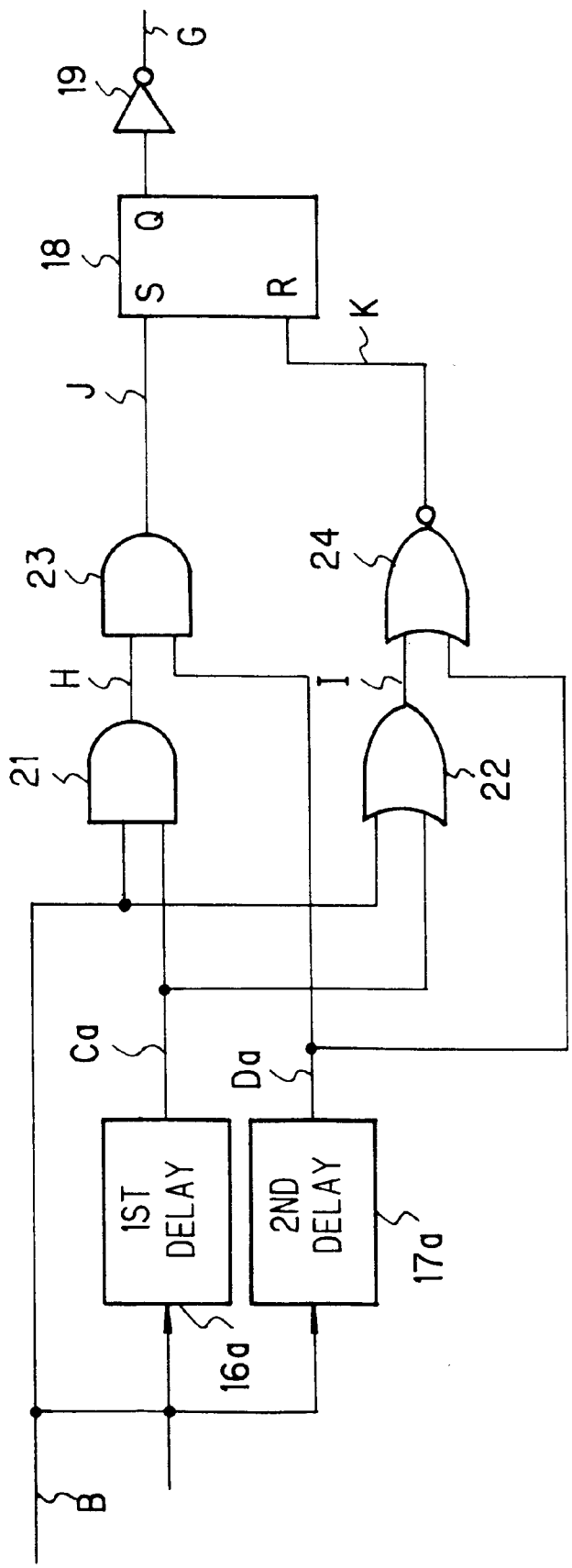
FIG. 3 shows a block diagram of another embodiment of the MSK modulator according to the present invention.

Referring to FIG. 3, a different embodiment of the MSK demodulator according to the present invention is shown. In the Figure, only a logic processing circuit is shown, and the delay detection circuit part shown in FIG. 1 is omitted. The logic processing circuit can remove chattering as discussed above in a manner to be described.

To the illustrated logic processing circuit, exclusive OR signal B is supplied from the exclusive OR gate 12 (FIG. 1). In the illustrated case, it is assumed that MSK signal to be processed has a symbol rate of 16,000 Hz, logic "1" has five cycles in one symbol time, and logic "0" has 4.5 cycles in one symbol time. In this case, the symbol time is 62.5 $\mu$sec., and the cycles of the logics "1" and "0" in the symbol time are 12.5 and 13.89 $\mu$sec., respectively.

The logic processing circuit includes a first and a second delay circuit 16a and 17a for delaying the exclusive OR signal B by 8.8 and 4.4 $\mu$sec., respectively. The first and second delay circuits 16a and 17a provide delayed exclusive OR signals (hereinafter referred to merely as delayed signals) Ca and Da. The exclusive OR signal B is also supplied to a first AND gate 21 and to an OR gate 22. The delayed signal Ca is supplied to the first AND gate 21 and OR gate 22.

The first AND gate 21 provides AND output signal H, which is supplied together with the delayed signal Da to a second AND gate 2. The OR gate 22 provides an OR output signal I, which is supplied together with the delayed signal Da to a NOR gate 24. The second AND gate 23 provides an AND output signal J which is supplied as set signal to an SRFF 18. The NOR gate 24 provides NOR output signal K which is supplied as reset signal to the SRFF 18. The SRFF 18 provides a set output signal, which is supplied through an inverter and as demodulation output signal G to the outside.

Figure 4:
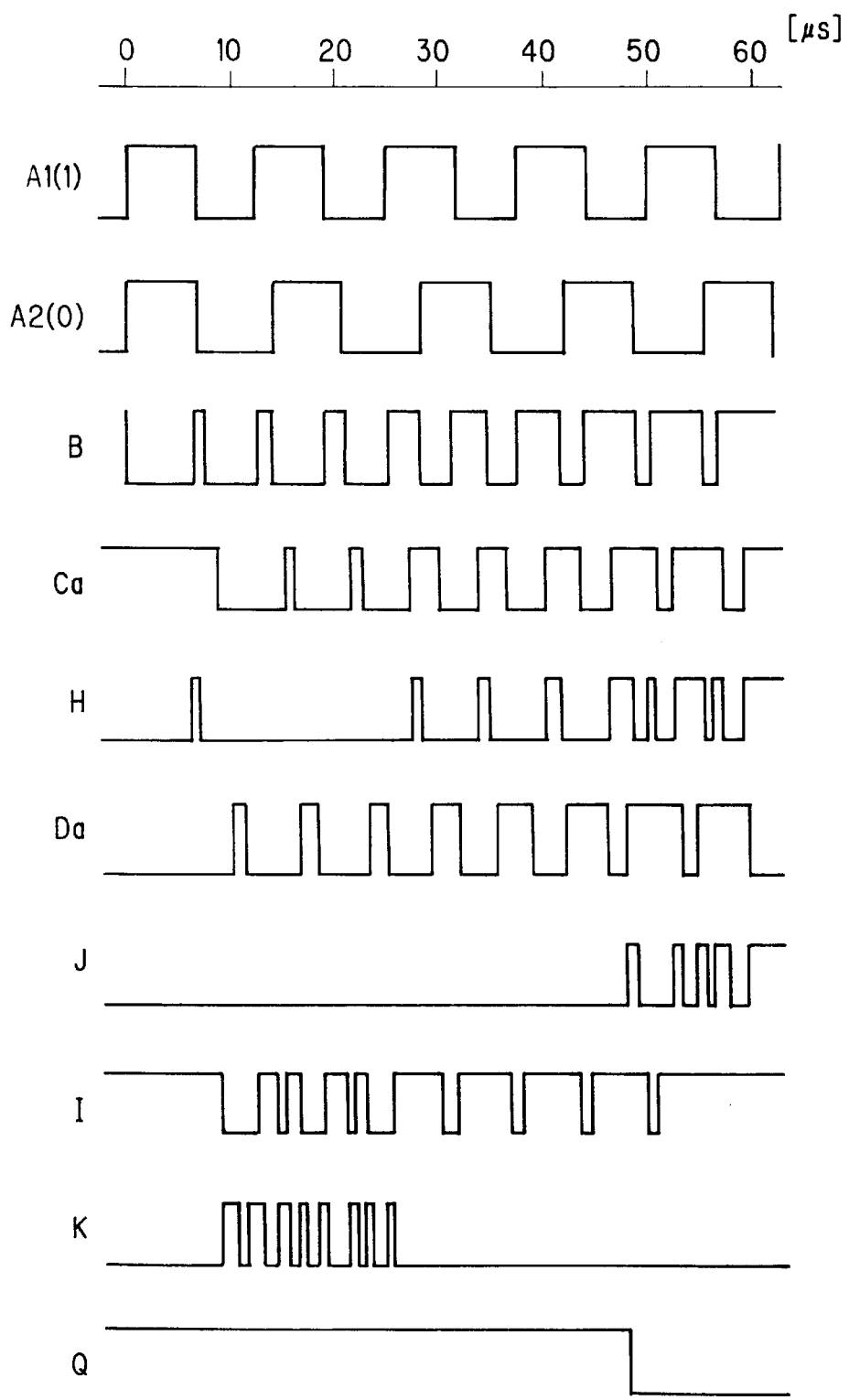
FIG. 4 shows waveforms for explaining the operation of MSK demodulation circuit shown in FIG. 3.

The operation of the logic processing circuit shown in FIG. 3 will now be described by having reference also to FIG. 4. In the case shown in FIG. 4, it is assumed that logic "1" is given as preceding MSK signal A1 and that logic "0" is given as present MSK signal A2. In this case, the exclusive OR circuit 12 (FIG. 1) supplies an exclusive OR signal B as shown in FIG. 4, containing high level pulses having successively increasing lengths, to the logic processing circuit. The first and second delay circuits 16a and 17b delaying this exclusive OR signal B by 8.8 and 4.4 sec., respectively, provides delayed signals Ca and Da as shown in FIG. 4.

The first AND gate 21 ANDs the exclusive OR signal B and the delayed signal Ca and provides AND output signal H as shown in FIG. 4. It will be seen from FIG. 4 that in this case the AND output signal H contains high level pulses, the length of which increases with high level pulse length increase of the exclusive OR signal B. The OR gate 22 which ORs the exclusive OR signal B and the delayed signal Ca, provides OR output signal I as shown in FIG. 4, containing high level pulses having increased lengths, and hence low level pulses having reduced lengths, during the second half of one symbol time.

The delayed signal Da contains pulses which are provided between adjacent pulses contained in the delayed signal Ca. Thus the two delayed signals Ca and Da do not overlap while the lengths of pulses of the delayed signal Da are less than the difference between the delay times of the first and second delay circuits 16a and 17a. In other words, the two delayed signals Ca and Da overlap when the lengths of pulses of the delayed signal Da exceed the difference between the delay times of the first and second delay circuits 16a and 17a.

The second AND gate 23 which ANDs the AND output signal H, containing pulses having lengths dependent on the pulse lengths of the delayed signal Ca, and the delayed signal Da, provides AND output signal J when the lengths of high level pulses of the delayed signal Da exceed the delay time difference. In this example, the AND output signal J is provided right before the end of one symbol time, and at this moment the SRFF 18 is set.

The OR gate 22 which Ors the exclusive OR signal B and the delayed signal Ca, provides OR output signal I containing short low level pulses. The NOR gate 24 NORs the OR output signal I and the delayed signal Da, obtained by delaying by the shorter delay time, and provides NOR output signal K, and provides logic "1" when and only when the OR output signal I and the delayed signal Da are both at the low level. For this reason, during the second half of the symbol time, during which both the OR output signal I and delayed signal Da contain high level pulses having increased lengths, the NOR gate 24 does not provide logic "1" as NOR output signal K. Instead, the NOR gate 24 provides logic "1" only during the first half of the symbol time.

The period during which logic "1" is provided as the NOR output signal K, and the period during which logic "1" is provided as the AND output signal J, are spaced apart in the symbol time. Thus, The SRFF 18 having once been set is not occasionally reset by the NOR output signal K. It is thus possible with the logic processing circuit in this embodiment to prevent chattering in the demodulation output signal G as in the case shown in FIG. 1.

While the logic processing circuit shown in FIG. 3 separately includes the first and second AND gates 21 and 22, it is of course possible to use a single three-input AND gate in lieu of the two AND gates. The delay times Ca and Da of the first and second delay circuits 16a and 17a may be changed by taking the cycle of the MSK signal into considerations.

As has been described in the foregoing, according to the present invention it is possible to quickly determine demodulation output signal in one symbol time by processing the exclusive OR signal obtained by delay detection in a process like parallel processing. In addition, it is possible to eliminate chattering by using delay circuits providing different delay times.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A demodulator for demodulating an MSK signal constituted by a sequence of MSK modulated symbols, comprising:
    a logic operation circuit for receiving the MSK signal and a delayed signal obtained by delaying the pertinent MSK signal by one symbol time and providing a logic operation result signal representing the result of a logic operation on the MSK signal and the delayed signal;
    a first delay circuit for delaying the logic operation result signal by a first delay time shorter than the one symbol time to provide a first delayed output signal;
    a second delay circuit for delaying the logic operation result signal by a second delay time shorter than the one symbol time to provide a second delayed output signal; and
    a logic processing unit for processing the first and second delayed output signals with the logic operation result signal in a parallel process,
    thereby decoding the MSK signal to recover symbols.

2. The MSK demodulator according to claim 1, wherein the first and second delay times are equal.

3. The MSK demodulator according to claim 1, wherein the first and second delay times are different from each other, and the second delay time is shorter than the first delay time.

4. The MSK demodulator according to claim 1, wherein the logic processing unit includes a first AND gate for ANDing the first delayed output signal and the logic operation result signal and providing a first AND signal, an OR gate for ORing the first delayed output signal and the logic operation result signal and providing an OR signal, a second AND gate for ANDing the second delayed output signal and the first AND signal and providing a second AND signal, a NOR gate for NORing the OR signal and the second delayed output signal and providing a NOR signal, a flop-flop circuit for being set by the second AND signal and reset by the NOR signal, thereby providing a set/reset output signal, and an inverter for inverting the polarity of the set/reset output signal.

5. The MSK demodulator according to claim 1, wherein the first and second delay times are different from each other by a time difference sufficient to prevent chattering occurring between adjacent symbols during decoding in the logic processing unit.

6. The MSK demodulator according to claim 5, wherein the first delay time is 8.8 microseconds, and the second delay time is 4.4 microseconds.

7. The MSK demodulator for demodulating an MSK signal constituted by a sequence of MSK modulated symbols to recover the sequence of symbols by receiving the MSK signals and delayed signal obtained by delaying the MSK signal by one symbol time and processing a logic operation result signal obtained by executing a logic operation on the MSK signal and the delayed signal, the logic operation result signal being delayed by different delay times to obtain a first and a second delayed output signal, the first and second delayed output signals being digitally processed with the logic operation result signal to remove chattering between adjacent symbols.

8. A demodulating method for demodulating an MSK signal constituted by a sequence of MSK modulated symbols, comprising, exclusive OR operation for the MSK signal and a delayed signal obtained by delaying the pertinent MSK signal by one symbol time to provide a logic operation result signal, delaying the logic operation result signal by a first delay time shorter than the one symbol time to provide a first delayed output signal, and delaying the logic operation result signal by a second delay time shorter than the one symbol time to provide a second delayed output signal, and processing the first and second delayed output signals with the logic operation result signal in a parallel process to decode the MSK signal.

9. The MSK demodulating method according to claim 8, wherein the first and second delay times are equal.

10. The MSK demodulator according to claim 8, wherein the first and second delay times are different from each other, and the second delay time is shorter than the first delay time.

* * * * *